United States Patent [19]

Pfeilstetter

[11] Patent Number: 4,486,163
[45] Date of Patent: Dec. 4, 1984

[54] NOZZLE FOR EXTRUDING A LAMINATED FOOD PRODUCT

[75] Inventor: Hans Pfeilstetter, Ampfing, Fed. Rep. of Germany

[73] Assignee: Convent Knabber-Geback GmbH & Co. KG, Cologne, Fed. Rep. of Germany

[21] Appl. No.: 401,343

[22] Filed: Jul. 23, 1982

[30] Foreign Application Priority Data

Jul. 29, 1981 [DE] Fed. Rep. of Germany ....... 3129947

[51] Int. Cl.$^3$ .......................... A23P 1/00; A21C 3/04
[52] U.S. Cl. ................................. 425/133.1; 99/450.7; 239/432; 425/376 R; 425/405 R; 425/462; 425/466
[58] Field of Search ..................... 425/113, 130, 133.1, 425/462, 376 B, 466, 405 R, 463; 99/450.7, 450.8; 239/432

[56] References Cited

U.S. PATENT DOCUMENTS

| | | | |
|---|---|---|---|
| 3,577,386 | 11/1970 | Grosbard | 99/353 |
| 3,615,675 | 10/1971 | Wisdom | 426/281 |
| 3,751,202 | 8/1973 | Coleman et al. | 425/133.1 |
| 4,028,024 | 6/1977 | Moreland | 425/133.1 |
| 4,167,383 | 9/1979 | Murakami et al. | 425/133.1 |
| 4,259,051 | 3/1981 | Shatila | 425/133.1 |

Primary Examiner—Willard E. Hoag
Attorney, Agent, or Firm—Anthony J. Casella; Gerald E. Hespos

[57] ABSTRACT

The present invention relates to a nozzle head for a cooking extruder for the production of a porous edible shell which is filled with an edible filling. The shell is of a breadlike character and the filling may be a sweet filling or an acid fat-containing filling.

The axis of the extruder nozzle is perpendicular to the axis of the extruder worm, and a filling tube through which a filling mass can be fed to the shell extends through the extruder nozzle.

In accordance with the invention, the filling tube 9 is surrounded by a mandrel 2 which forms with the tube an annular space 7 which separates said tube from the space conducting the molten material and extends to the outlet opening 6 of the extruder nozzle 3.

In this way the filling tube and the melt are thermally separated from each other so that the filling tube is not heated while, on the other hand, the melt is not cooled at the outlet end.

The invention also covers the method of producing a light, puffed, center-filled food product with the use of the above-mentioned nozzle head as well as the light, puffed, center-filled food product produced with the use of this nozzle head.

5 Claims, 1 Drawing Figure

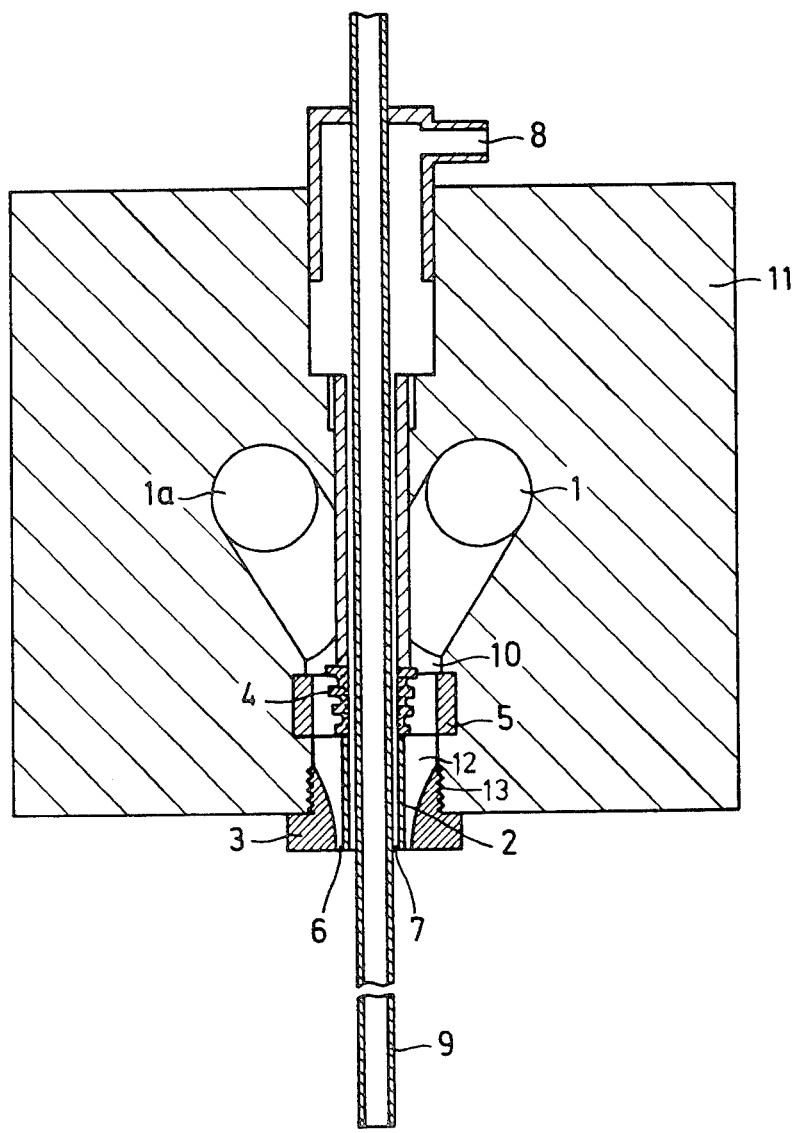

NOZZLE FOR EXTRUDING A LAMINATED FOOD PRODUCT

The present invention relates to a nozzle head for a cooking extruder the axis of the extruder nozzle of which extends perpendicular to the axis of the extruder worm, a filling tube extending through the extruder nozzle thereof. The invention also relates to a method of producing a light, puffed, center-filled food product with the use of this nozzle head, as well as the product itself.

Such a nozzle head for a cooking extruder is known from U.S. Pat. No. 3,615,675. By such a nozzle head for a cooking extruder there is continuously produced a crisp, puffed shell which is developed in the manner of knackebrod and this shell is filled with an edible mass completely in one operation. The known cooking extruder has a worm. If a moist farinaceous material is conducted through the extruder, a pressure is built up. The material becomes fluid and a semi-plastic dough is formed in which the water remains in liquid condition as a result of the pressures and temperatures developed. When the dough emerges from the extruder nozzle and is subjected to a reduced pressure, for instance, atmospheric pressure, the liquid evaporates and a porous cellular body is produced. In the known cooking extruder, the melt flow path is deflected 90° in front of the outlet nozzle and a filling tube extends through the outlet nozzle, this tube extending beyond the outlet nozzle. In this way an annular space is formed in the outlet nozzle and the melt emerges as a shell which can then be filled.

In the known cooking extruder, the melt which has emerged from the extruder worm is in direct contact with the cold filling tube in the nozzle, which results in difficulties. On the one hand, the filling mass, which generally contains fat, may be excessively heated so that it becomes liquid and then damages the shell produced. On the other hand, the melt can be cooled by the cold filling tube directly before the puffing to a temperature below 100° C. so that the liquid no longer evaporates upon emergence and no porous cellular body is formed. Furthermore, the puffed shell thereby solidifies very rapidly and therefore very easily remains adhering to the expanding filling tube.

The object of the invention is to develop the cooking extruder in such a manner that, on the one hand, the filling mass is not heated and, on the other hand, the melt is not cooled upon emergence and in all cases has a temperature which is above 100° C. Furthermore, the vapor produced within the shell is not to pass into the final product.

In accordance with the invention, this object is achieved in the manner that the filling tube is surrounded by a mandrel which, together with it, forms an annular space—and therefore a sleeve—which separates said filling tube from the space conducting the melt and extends to the outlet opening of the extruder nozzle. As a result of this development the filling tube can be isolated from the melt so that, on the one hand, the filling mass cannot melt in the filling tube and, on the other hand, the melt itself upon its emergence from the extruder nozzle still has the temperature necessary in order to permit evaporation of the liquid. In the high-pressure extrusion process, about 8% water evaporates from the extruded product at the time of emergence from the nozzle. The expanded shell, which consists of a honeycomb structure of gelatinized starch material, is therefore very slightly dissolved and deformed upon coming together with water.

Steam should not accumulate in the expanded shell since in that case the shell is weakened at individual points as a result of the resultant condensate and the filling mass can emerge at such places. The annular space between the filling tube and the mandrel is therefore connected with a vacuum pump by which vapors which form upon the expansion can be drawn off. In order to form a good shell, the space conducting the melt and surrounding the mandrel must be filled properly. Therefore, the melt emerging from the extruder screw is divided into two individual streams which, with deflection by 90° are brought together around the mandrel upstream of the extruder nozzle. In this way, flow velocity and the pressure of the melt can be distributed uniformly around the circumference of the mandrel. At the places where the two individual streams of the melt come together, there is only an incomplete flowing together of the two streams due to flow paths of different lengths as well as different mechanical and thermal stresses on the melt. Upon removal from the extruder nozzle, flow seams or thin points are thereby produced in the extruded shell, at which places the filling mass can emerge.

In order to counteract the development of flow seams, a smearing thread is installed in the flow path of the melt, upstream of the extruder nozzle. The smearing thread causes a deflecting of the molten stream in tangential direction, as a result of which the flow seams are wiped out.

It is particularly advantageous for the smearing thread to surround the mandrel.

A replaceable ring can advantageously surround the smearing thread with the formation of an annular space. By the insertion of rings of different thickness, the width of the annular gap between the smearing thread and the metal ring can be adjusted so that the feeding of the melt can be optimally adapted to the rheological properties of the melt.

The feeding of the extruder melt and the feeding of the filling mass are completely independent of each other, so that the dosaging of the two components without influencing the temperature of each other is possible. The filling mass is fed through the filling tube into the solidified shell at a distance of about 40 cm from the extruder nozzle.

The filled solidified tube is divided by a squeezing-off device into individual bars which are then dried.

The extruder nozzle can be provided with a thread so that an impounding space of variable volume is obtained upon screwing into the nozzle head. By the turning of the extruder nozzle, the impounding space can be reduced or increased in size. In this way an optimal adaptation to the flow properties of the substance to be worked can be effected during the extrusion, so that a closed, uniformly expanded tube emerges from the extruder.

It has been found advantageous to use a steel tube coated with plastic (teflon) since in this way better thermal separation is obtained in the cold filling mass and the filling body which is still hot.

Another advantage of the plastic-coated filling tube is its better slidability so that adherence of the puffed shell to the filling tube is reliably avoided.

One embodiment of the invention will be explained in the following description, with reference to the drawing.

The drawing shows a sectional view through the nozzle head of the cooking extruder, the section being perpendicular to the axis of the worm. The worm section of the cooking extruder is not shown.

The nozzle head 11 has two melt feed conduits 1a and 1, the melt emerging perpendicular to the plane of the drawing from the extruder worm and being fed to the nozzle head 11. The individual streams 1 and 1a are deflected downward 90° towards the extruder nozzle 3.

A filling tube 9 extends through the extruder nozzle 3 and this tube conducts the filling mass. The filling tube 9 discharges at a distance of about 40 cm from the extruder nozzle 3.

Within the space 10 which conducts the melt, the filling tube 9 is surrounded by a mandrel 2 of tubular development in such a manner that this mandrel 2 isolates the filling tube 9 from the melt upstream of the outlet opening 6.

This isolation keeps the filling tube 9 cool and, on the other hand, prevents the melt from cooling in the outlet opening of the extruder nozzle 3 in such a way that evaporation of the liquid no longer takes place.

Between the filling tube 9 and the mandrel 2 there is an annular space 7, and this annular space 7 is in communication with a vapor exhaust vacuum pump 8.

When the melt emerges from the extruder nozzle 3 and expands, large quantities of steam are produced which could soften the tubular porous body. This is reliably prevented by the drawing off of the resultant steam.

The division into two individual streams 1 and 1a is necessary in order to fill the annular space around the mandrel 2 sufficiently with melt. In order to prevent the formation on the shell of a seam which could lead to weak points, a smearing thread 4 is provided in the flow path of the melt. The smearing thread 4 advisedly surrounds the mandrel 2. The purpose of the smearing thread 4 is to deflect the stream of melt tangentially and thus wipe off any seams.

At the height of the smearing thread a replaceable ring 5 is arranged in the flow path of the melt, said ring forming an annular space with the smearing thread, and this annular space can be adjusted by metal rings 5 of different thickness in order optimally to adapt the flow path to the rheological properties of the melt.

The extruder nozzle 3 can be provided with a thread 13 so that an impounding space 12 of variable volume is obtained upon screwing into the nozzle head 11. By the turning of the extruder nozzle 3, the impounding space 12 can be reduced or increased in size. Thus, as explained above, an optimal adaptation to the flow properties of the substance to be worked can be effected during the extrusion, so that a closed, uniformly expanded tube emerges from the extruder.

The method of the invention for the production of a light, puffed, center-filled food product in which super-atmospheric pressures and a temperature above the boiling point of the liquid at a given lower pressure are produced within a mass of food material which contains a liquid and this material is conducted through a generally circular opening to a zone of said lower pressure, the material thus expanding by evaporation of the liquid therein, and the expanded material is conducted as a long hollow body (shell) through a cooling zone which has a considerably greater length than the outside diameter of the shell and conducts heat away from the shell into the cooling zone, and in which a filling material is injected into the center of the shell after this shell has expanded and is sufficiently coherent to hand unsupported without breaking and the shell is then possibly cut into segments and baked, resides in the fact that the filling tube (9) used for the filling of the shell is surrounded by a mandrel (or sleeve) (2) which together with the tube forms an annular space (7) and separates said filling tube (9) from the space (10) conducting the melt, the mandrel extending to the outlet opening (6) of the extruder nozzle (3).

The mass of edible material which contains a liquid is preferably a moist farinaceous material and the liquid is customarily water which is added as such or may come, for instance, from milk or other edible liquids such as juices. The mass of edible material is preferably at a temperature of about 100° to 150° C. and under a pressure of about 150 to 250 atmospheres within the extruder. Upon extrusion from the extruder nozzle, an expansion then takes place the amount of which can be adjusted in known fashion by the pressure and temperature of the mass within the extruder. In accordance with a particularly preferred embodiment, the steam liberated is withdrawn from the annular space (7) between the filling tube (9) and the sleeve (2).

The following examples will serve to explain the invention:

EXAMPLE 1

An extrusion mix is formed from the following components:
100 kg semolina
8 kg water
1 kg salt
1 kg vegetable fat.

This mixture is now worked in a cooking extruder which is provided with the nozzle head described in the application. A uniform expanded tube of a cross section of about 15 mm now emerges from this nozzle. The temperature at the nozzle is 125° C. and the pressure about 190 bar.

A commercial nougat mass is fed through the filling tube by means of a high pressure pump. About 40 cm after emergence from the extruder nozzle, the expanded tube is filled with the nougat mass.

Thereupon the filled tube is divided by a cutting device into pieces of a length of about of 10 cm. These pieces are dried on a belt dryer at 70° C. down to a final water content of 4%. The result is light nougat-filled bars with a shell/filling ratio of 1:2.

EXAMPLE 2

Products of the "filled chip" type can be produced by the same method.

For this an extrusion mixture of the following composition is used:
100 kg ground dried potatoes
1 kg salt
1 kg vegetable fat
9 kg water.

As filling there is used a cheese cream which is prepared by mixing:
100 kg coconut fat
27 kg dried cheshire cheese
1.5 kg table salt
0.5 kg dried garlic.

The filled tube is slightly flattened by means of two rolls and then cut by a cutting device into pieces of a length of 1.5 cm.

The result is cushioned shaped "chips" having a cheese filling.

I claim:

1. A nozzle head for a cooking extruder whose nozzle axis extends perpendicular to the axis of the extruder worm, a filling tube extending through the extruder nozzle thereof, characterized by the fact that the filling tube is surrounded by a mandrel which forms together with the filling tube an annular space, said annular space being in communication with a vacuum pump, said mandrel separating said filling tube from a space which conducts a melt and extending the outlet opening of the extruder nozzle, the melt emerging from the extruder worm passing into into two individual passages which, with a deflection of 90°, are brought together around the mandrel upstream of the extruder nozzle, a smearing thread being disposed in the flow path of the recombined melt upstream of the extruder nozzle.

2. A nozzle head for a cooking extruder according to claim 1, characterized by the fact that a replaceable ring surrounds the smearing thread with the formation of an annular space therebetween.

3. A nozzle head for a cooking extruder according to claims 1 or 2 characterized by the fact that the extruder nozzle is provided with a thread so that an impounding space of variable volume is produced upon screwing into the nozzle head.

4. A nozzle head for a cooking extruder for producing a center-filled food product having an inner filling and an outer shell, said cooking extruder being in communication with a source of melt from which said outer shell is formed, said melt being urged to the nozzle head by an extruder worm, said cooking extruder further being in communication with a vacuum means, said nozzle head including:

an extruder nozzle having an axis which extends perpendicular to the axis of the extruder worm;

a filling tube extending through the extruder nozzle;

a mandrel surrounding said filling tube such that an annular space is defined between said mandrel and said filling tube, said annular space being in communication with said vacuum means; and passages for first and second streams in communication with the source of melt and the extruder nozzle, said passages for first and second streams extending through a deflection of 90° intermediate the source of melt and the nozzle, said passages for first and second streams joining intermediate the 90° deflection and the nozzle so as to distribute the pressure of the melt uniformly around the mandrel and to provide a continuous mass of the melt around the mandrel, and means for eliminating flow seams intermediate the extruder nozzle and the point where said passages for first and second streams join.

5. A nozzle head as in claim 4 wherein the means for eliminating flow seams comprises a smearing thread surrounding said mandrel.

* * * * *